United States Patent Office

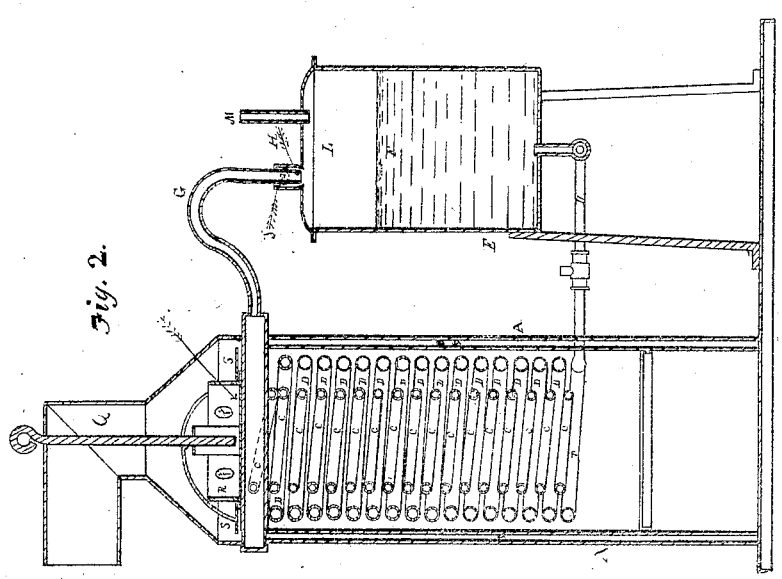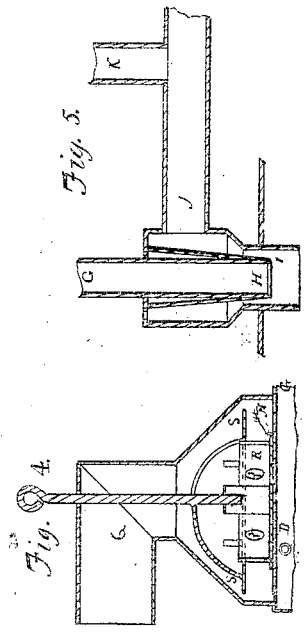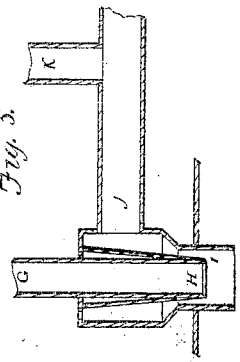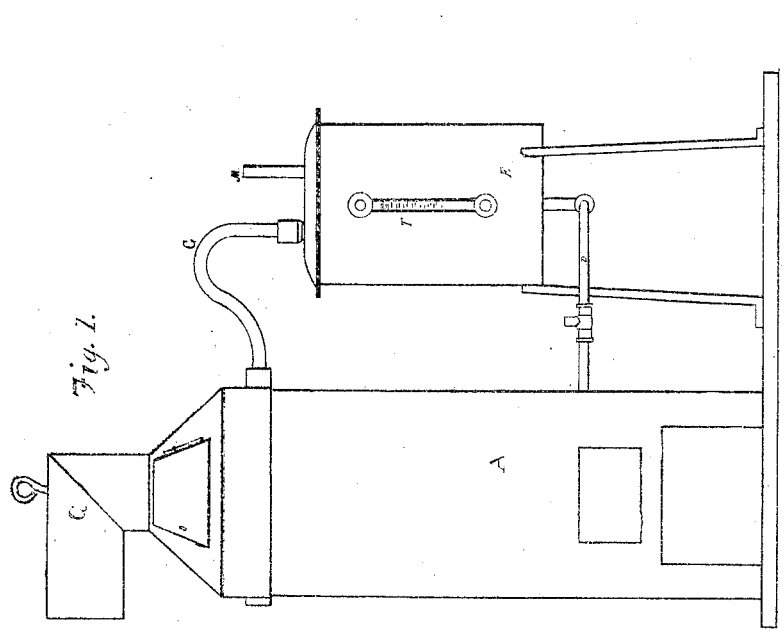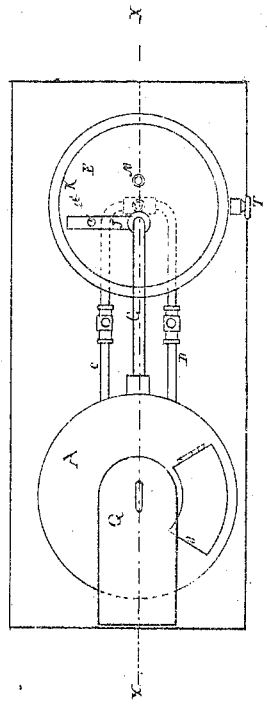

BENJAMIN IRVING, OF NEW YORK, N. Y.

Letters Patent No. 73,608, dated January 21, 1868.

---

IMPROVEMENT IN STEAM-GENERATING APPARATUS FOR HEATING BUILDINGS.

---

The Schedule referred to in these Letters Patent and making part of the same.

---

TO ALL WHOM IT MAY CONCERN:

Be it known that I, BENJAMIN IRVING, of the city, county, and State of New York, have invented certain new and useful Improvements in Apparatus for Generating Steam for Heating Buildings, and other purposes; and I do hereby declare that the following is a full description of the same.

The nature of my invention consists, first, in combining with the said coils of pipe and furnace a compound damper or fire-regulator, for the purpose of diffusing the flame of the fuel throughout the coils of pipe, and at the same time limiting its action thereon; second, in combining with the coils of pipe a perpetual reservoir, for the supply of water to the coils of pipe; third, the combination and arrangement of the nozzle of the steam-pipe, entering the water-reservoir, (or steam-chamber,) within the interior of the return or condensed-water pipe, for re-supplying the water-reservoir with water as fast as converted into steam, and thus keep up a perpetual supply of water in the reservoir.

But to describe my invention more particularly, I will refer to the accompanying drawings, forming a part of this specification, the same letters of reference, wherever they occur, referring to like parts.

Figure 1 is a side elevation of the apparatus.

Figure 2 is a vertical cut-section of the same through the line $x\ x$, fig. 3.

Figure 3 is a plan view of the apparatus.

Figure 4 is a detached sectional view of the arrangement of dampers when open.

Figure 5 is a detached sectional view of the nozzle of the steam-pipe, within the condensed return-water pipe, on an enlarged scale.

Letter A is a cylindrical furnace, the sides or walls of which are double, and filled in with plaster of Paris B, or other suitable non-conductor of heat. A furnace, having walls made of fire-brick, or other suitable material, will answer a good purpose, but in many respects I prefer the double walls filled with plaster of Paris, for confining the heat in the furnace, so as to enable me to use a smaller quantity of fuel than would be possible if not thus protected. In the furnace, above the grate-bars, are arranged two (or more or less number if desired) coils of pipe C and D. The lower ends of these pipes communicate with the lower end of a water-reservoir, E, from which the water F can flow freely into the coils of pipe, to be therein converted into steam. The steam thus generated is then discharged from their upper ends, through a pipe, G, into the upper part of the water-reservoir. Surrounding the nozzle H of the pipe G is a funnel, I, forming the termination of a condensed water or injection-pipe, J, having in one side of it a feed-water pipe, K, through which the reservoir is supplied with new water, when required. The object of this arrangement of the nozzle of the steam-pipe within the funnel I is to use the jet or stream of steam, flowing into the chamber L, or space between the head of the reservoir and surface of the water F in it, for the purpose of drawing in (as it may be said) the condensed water returning to the reservoir from the heaters or pipes distributing the steam through the building. This is done in consequence of the partial vacuum formed at the end of the nozzle, and the friction of the steam upon the water, by its rapid escape through the funnel into the chamber. As heat does not readily descend into a body of water, it will be obvious that but slight condensation of the steam entering the chamber will take place, and, therefore, the space above the water will always form a perfect steam-chamber, from which a full supply may be taken, through the pipe M, to any heating-apparatus in the building, or to an engine, when used for such purposes. It will be obvious, that for the purpose of keeping up the continuous operations of the apparatus, the return-pipes of the heaters will connect with the end of the pipe J, and thus return the condensed water formed in the radiating or heater-pipes of the building to the reservoir, to keep up the perpetual supply of water to the apparatus.

Letter N is a damper, used for covering the core or central part of the coils of pipe, in the furnace. The object of this is to deflect the direct draught of the furnace, and thus compel the flames to pass outwards through the spaces between the coils, before reaching the smoke-pipe Q. On the upper side, and near the edge of the damper N, is elevated a broad band, R, having in it several openings, $r^2$. These openings are used for draught-holes, to allow the gases and smoke of the furnace to escape thereby, to the smoke-pipe, according as the regulator damper S is elevated, as shown in fig. 4, where the full-draught holes are open. To reduce the draught of the furnace, the regulator damper is lowered, so as to cut off parts of the draught-holes, and, when cutting it off entirely, for the purpose of making the furnace smoke-consuming or air-tight, the regulator damper is shut down, as represented in fig. 2. It will be obvious that by the application of the well-known principle of operating steam-dampers, the regulator may be made self-adjustable.

Letter T is a water-gauge, attached to the side of the water-reservoir, for indicating the quantity of water in it.

Having now described my invention, I will proceed to set forth what I claim, and desire to secure by Letters Patent of the United States.

1. I claim the combination and arrangement of the dampers N and S, made and operating substantially as hereinbefore set forth.

2. I also claim, in combination with the coils of pipe, and dampers N and S, the perpetual reservoir of water E, made and operating substantially as hereinbefore set forth.

3. I also claim the combination and arrangement of the nozzle H with funnel I, substantially as hereinbefore set forth, and for the purposes described.

BENJAMIN IRVING.

Witnesses:
    C. L. BARRITT,
    FRANKLIN BARRITT.